United States Patent
Hoya et al.

(10) Patent No.: US 6,986,606 B2
(45) Date of Patent: Jan. 17, 2006

(54) BALL BEARING AND LUBRICATING METHOD THEREOF

(75) Inventors: Shigenori Hoya, Kitasaku-gun (JP); Hideki Matsuoka, Kitasaku-gun (JP)

(73) Assignee: Minebea Co., Ltd., Miyota (JP)

( * ) Notice: Subject to any disclaimer, the term of this patent is extended or adjusted under 35 U.S.C. 154(b) by 0 days.

(21) Appl. No.: 10/408,265

(22) Filed: Apr. 8, 2003

(65) Prior Publication Data

US 2003/0190104 A1    Oct. 9, 2003

Related U.S. Application Data

(63) Continuation of application No. 09/722,721, filed on Nov. 28, 2000, now abandoned.

(30) Foreign Application Priority Data

Mar. 23, 2000   (JP) ............................... 2000-81943

(51) Int. Cl.
   *F16C 33/56*      (2006.01)
(52) U.S. Cl. ............... 384/470; 384/462; 384/907; 384/526
(58) Field of Classification Search ........... 384/480, 384/492, 402, 323, 160, 241, 527, 907, 213
   See application file for complete search history.

(56) References Cited

U.S. PATENT DOCUMENTS

| 3,212,832 A | 10/1965 | Mayer et al. |
| 4,797,011 A | 1/1989 | Saeki et al. |
| 4,997,295 A | 3/1991 | Saitou |
| 5,529,401 A * | 6/1996 | Gabelli et al. ............. 384/470 |
| 5,728,020 A | 3/1998 | Muranaka et al. |

FOREIGN PATENT DOCUMENTS

| EP | 0 036 690 | 9/1981 |
| EP | 0 275 080 | 7/1988 |

OTHER PUBLICATIONS

Patent Abstracts of Japan, vol. 009, No. 311, Dec. 7, 1985 (1 page) - Abstract of JP 60 146917A (NTN TOYO Bearing KK) Aug. 2, 1985 *abstract*.

* cited by examiner

*Primary Examiner*—Matthew C. Graham
(74) *Attorney, Agent, or Firm*—Oliff & Berridge, PLC

(57) ABSTRACT

The churning type of grease of a viscosity of 15–20 mm$^2$/s and a worked penetration of 200–230 is disposed at the rolling surface of the race portions and the channeling type of grease of 25–35 mm$^2$/s and a worked penetration of 240–270 is disposed at the retainer. By constituting as such, at rotation of the ball bearing, maintaining the lubricant oil film in the bearing the lubrication can be continued, and at non-rotation of the ball bearing the lubricant oil film is protected by the grease to prevent fretting.

4 Claims, 2 Drawing Sheets

BALL BEARING AND LUBRICATING METHOD THEREOF

This is a Continuation of application Ser. No. 09/722,721 filed Nov. 28, 2000 now abandoned. The entire disclosure of the prior application is hereby incorporated by reference herein in its entirety.

BACKGROUND OF THE INVENTION

1. Field of the Invention

The present invention relates to a ball bearing and a lubricating method thereof, in particular, the ball bearing which has a resistance against a fretting characteristic when non-rotating and a lubricating property when rotating by disposing greases different in property respectively, and a lubricating method thereof.

2. Related art

In general, a ball bearing is lubricated by being applied with a grease, as shown in FIG. 3, within the bearing between an outer race 1 and an inner race 2, and a torque transmittance property of the ball bearing and the resistance property against fretting depends on the property of the grease to be applied. For reference, in a use of a spindle motor for HDD (hard disk drive) which is required to give a low torque and a low noise, a churning type of grease having a basic oil viscosity of 25~35 mm$^2$/s and a worked penetration of 240~270 is mainly used. Further, the grease of this type is superior in a property of maintaining a rolling life at the time of rotation of the bearing.

However, this grease of this type is not effective for protecting a contact surface of the inside of the bearing from the fretting generated at the time of non-rotation of the bearing, and in general, it has been known that a churning type of grease having a basic oil viscosity of 15~20 mm$^2$/s and a worked penetration of 200~230 is superior in a resistance property against a fretting at the time of non-rotation of the bearing.

This is because, on one hand, a basic oil having a high viscosity is easily to be excelled from a contacting surface between balls 3 and rolling surfaces 1a, 2a and difficult to enter therebetween, it is not effective for protecting the contacting surface and on the other hand, because a basic oil having a low viscosity is natured to easily enter the contact surface and form an oil film on the contact surface to protect the contact surface to protect the contact surface by preventing it from being fretted. A resistance against fretting property of the bearing at the time of non-rotation is available by applying the above oil of viscosity (15~20 mm$^2$/s), but, the life for maintaining the property is short and at the time of rotation of the bearing the oil is scattered from a boundary face by being stirred to lose lubrication.

The present invention has been made in the above circumstance and the object thereof is to provide a ball bearing having both properties of a fretting resistance at the time of non-rotation and being lubricated at the time of rotation, and a lubricating method thereof.

In order to attain the above object, according to a first aspect of the present invention, it is characterized by disposing a grease for protecting a lubricated surface of race portions and another grease for maintaining lubrication on a retainer portion.

By this arrangement, the lubricated surface formed in the bearing is protected by the grease for protecting the lubricated surface and the lubrication is maintained on the lubricated surface by the lubrication maintaining grease.

According to a second aspect of the present invention, a viscosity of a basic oil for protecting the lubricated surface is lower than a basic oil for maintaining the lubrication.

By setting as such, a quick entering of the grease for protecting the lubricated surface at non-rotation of the ball bearing into the contact surface of the race portions can be assured to protect the lubricated surface.

According to a third aspect of the present invention, the grease for protecting the lubricated surface and the grease for maintaining the lubrication are disposed close each other.

By setting as such, a lubricant separated from the grease for maintaining the lubrication can be supplied quickly to the lubricated surface.

Further, according to a fourth aspect of the present invention, the grease for protecting the lubricating of the lubricated face is a churning type of a basic oil viscosity of 15~20 mm$^2$/s and a worked penetration of 200~230, and the grease for maintaining lubrication is of a channeling type of a basic oil viscosity of 25~30 mm$^2$/s and a worked penetration of 240~270.

Further, according to a fifth aspect of the present invention, a grease for protecting the lubricated surface is disposed at race portions, and the grease for maintaining the lubrication by the grease for protecting the lubricated surface is disposed at a retainer portion, and the lubricated surface is formed at non-rotation of the ball bearing and the lubrication is maintained by the grease for maintaining the lubrication at rotation of the ball bearing.

By arranging as such, the lubricated surface can be maintained by the grease for maintaining the lubricated surface at the time of the rotation of the ball bearing and the lubricated surface is protected by the grease for protecting the lubricated surface to avoid the fretting at the contact surface at the time of no-rotation of the ball bearing.

Further, according to a sixth aspect of the present invention, the grease for protecting the lubricated surface and the grease for maintaining the lubrication are disposed close, and the lubrication is adapted to be maintained by supplying gradually the grease for maintaining to the lubricated surface at rotation of the ball bearing.

By arranging as such, the lubricant separated from the grease for maintaining the lubrication is supplied on the lubricating surface quickly at rotation, and even at the time of a high speed rotation of the ball bearing, the lubricated surface is maintained and the lubrication of the ball bearing can be continued.

EMBODIMENT

Figure 2:
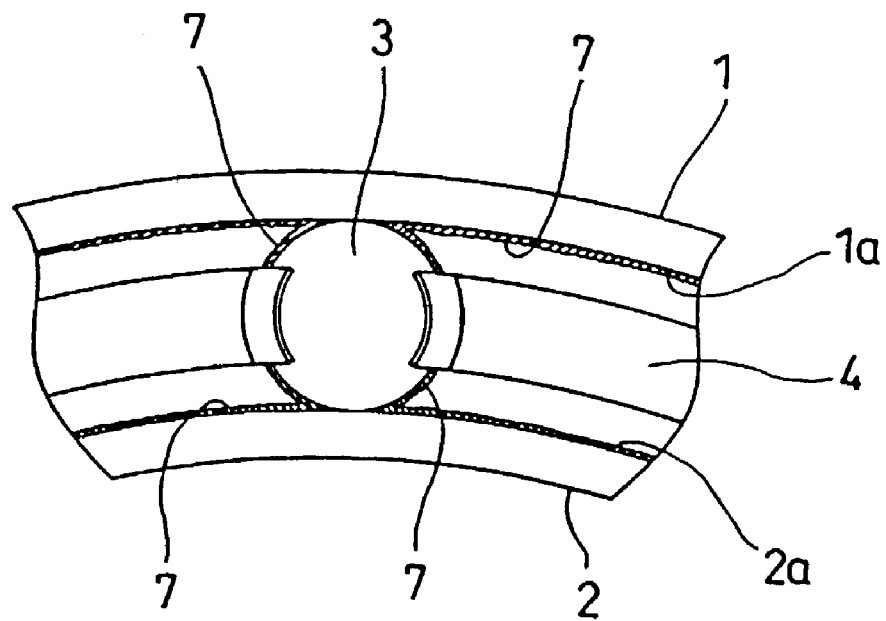
FIG. 2 is for explanation of the embodiment of the ball bearing of the present invention, in particular, for showing the disposition of the grease in the bearing.
Figure 3:
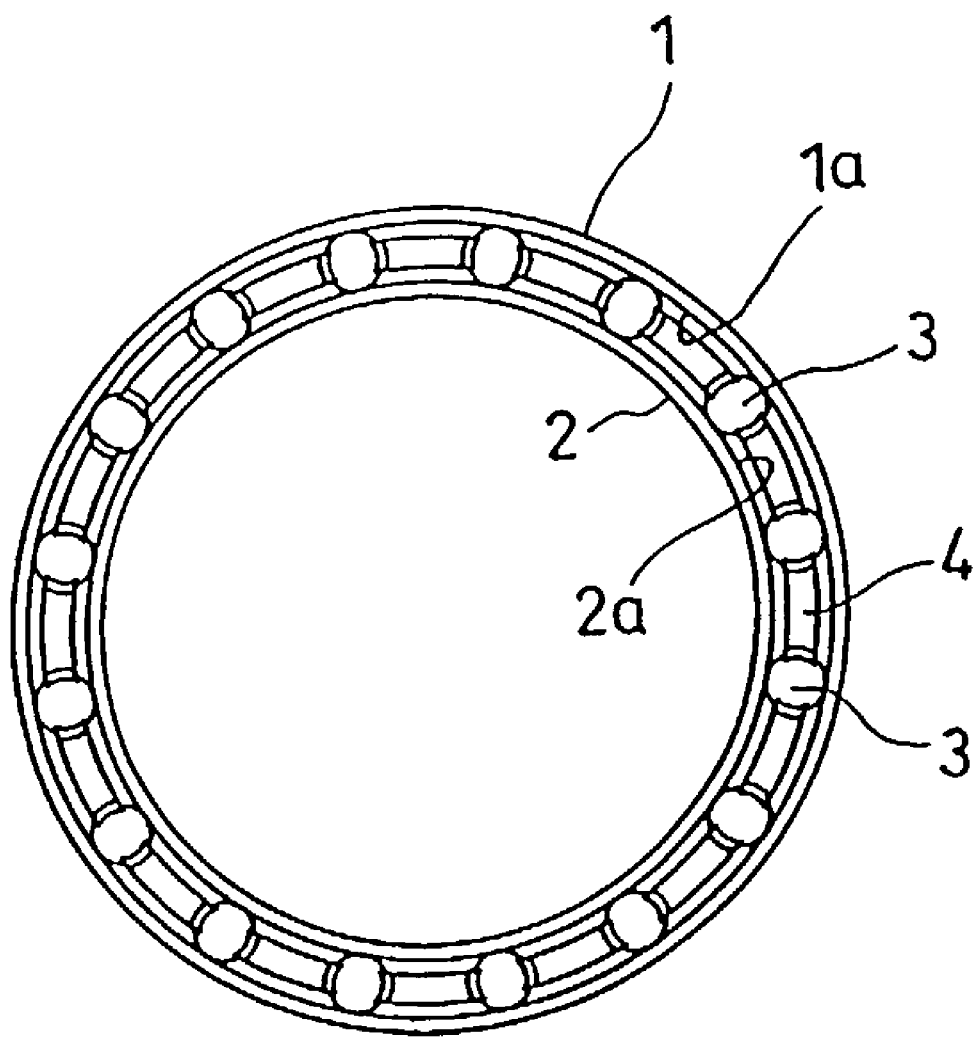
FIG. 3 is for showing the whole of the ball bearing.

One embodiment of a ball bearing and a lubricating method of the present invention will be explained referring to FIGS. 1~3. First, an outline of the embodiment of the ball bearing of the present invention is explained. The ball bearing of the embodiment of the present invention is provided with, as shown in FIG. 3 an outer race 1 and an inner race 2 as race portions, a ring-shaped retainer portion 4 to support a plurality of balls 3 rotatably, and by making the retainer 4 interposed between the outer race 1 and the inner race 2 and making a plurality of balls 3 held on the retainer 4 rolled on a rolling face 1a of the outer race 1 and a rolling surface 2a of the inner race 2 to displace the outer race 1 and the inner race 2 relatively.

Figure 1:
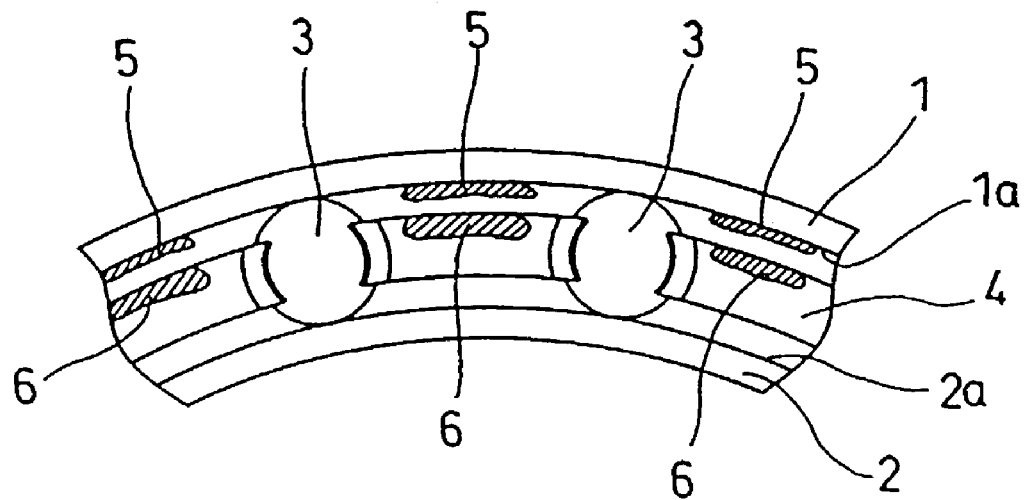
FIG. 1 is for explanation of the embodiment of the ball bearing of the present invention, in particular, for showing, the lubricant oil film formed in the bearing.

Further, the ball bearing of the embodiment of the present invention is, as shown in FIG. 1, structured to lubricate the inside of the ball bearing in such a manner as a lubricant film 7 as a lubricant surface is, formed on the surfaces of the rolling surfaces 1a, 2a in the ball bearing, the retainer 4 and the balls 3 with the grease 5 applied on the rolling face 1a of the outer race 1 (hereinafter referred to as "grease A5 ") and the grease 6 applied on the retainer 4 (hereinafter referred to as "grease B6").

Next, details of the grease A5 and B6 to lubricate the inside of the bearing are explained. As the grease A5, as shown in Table 1, a so-called churning type of grease is used, in which it is stirred by being shared at a basic oil viscosity of 15~20 $mm^2/s$ (40° C.) and a worked penetration of 200~230. Thereby, the grease A5 prevents the contact surface from fretting at the time of non-rotation of the ball bearing by forming rapidly a lubricant film 7 on the contact surface with the basic oil of low viscosity entered between the balls and the rolling surfaces 1a, 2a and at the time of rotation of the ball bearing the rotation torque is adapted to be reduced since the grease is scattered under a churning action and the stirring resistance of the grease is controlled.

Next, the grease B6, to be applied on the retainer 4 is explained. As the grease B6, a so-called channeling type of grease is used, in which, comparing with the grease A5 as shown in Table 1, the basic oil viscosity is 25~35 $mm^2/s$ (40° C.) being greater than the one of the grease A5, a worked penetration is 240~270 being harder than the grease A5, thereby it is multi-layered to interpose a separated lubricant in a gap between the layers. Thereby, the grease B6 receives a centrifugal force by a high speed rotation of the retainer 4 at the time of rotation of the ball bearing, and by this centrifugal force it operates a channeling action to separate gradually the lubricant having a greater viscosity, and by supplying gradually the separated lubricant to the lubricant film 7 the lubrication in the bearing is maintained and continued.

TABLE 1

| Type | Basic oil viscosity (40° C.)($mm^2/s$) | Worked penetration |
| --- | --- | --- |
| Grease A churning | 15~20 | 200~230 |
| Grease B channeling | 25~35 | 240~270 |

In such a constitution, operations of the embodiment of the ball bearing of the present invention and the lubricating method thereof are explained. First, at the retainer of the ball bearing, the grease B6 applied on the retainer 4 operates a channeling action due to the centrifugal force by a high speed rotation of the retainer 4 to separate the lubricant having a greater viscosity. And, the grease B6 maintains the lubricant film 7 as a lubrication face by a gradual supply of the separated lubricant to the lubricant film 7, and can continue the lubrication of the boundary surface between the balls 3 and the rolling surfaces 1a, 2a. Further, by disposing the grease B6 close to the grease A5, it is possible to supply the lubricant separated from the grease B6 rapidly to the lubricant film 7 and prevent the lubricant film from lacking at the boundary surface at the high rotation of the bearing. And, it may maintain the lubricant film 7 as a lubrication surface and continue to lubricate the boundary surface between the balls and the rolling surfaces 1a, 2a. Further, at the non-rotation of the ball bearing, the lubricant film 7 is rapidly formed as the grease A5 having a small viscosity enters between the rolling surfaces 1a, 2a and the balls 3, so that the fretting generated by outer vibration on the contact surface can be avoided.

As mentioned above, in the ball bearing of the embodiment of the present invention, the grease A5 the viscosity of which is small and which is the churning type of grease A5 is disposed at the retainer 4. Accordingly, at rotation of the ball bearing, the grease B6 operates as a channeling type and the lubricant having large viscosity is made to be separated and supplied gradually to the lubricant oil film 7 as a lubricant surface, so that the lubricant oil film 7 is maintained and the lubrication is continued. Further, since the grease B6 is disposed close to the grease A5, the lubricant separated from the grease B6 is supplied to the lubricant film 7 rapidly, in particular, by preventing the lubricant oil film 7 from lacking at a high rotation of the bearing to continue the lubrication of the boundary surface. Further, at non-rotation of the ball bearing, the grease A5 makes the lubricant having small viscosity rapidly entered the contact surface between the balls 3 and the rolling surfaces 1a, 2a and the lubricant film 7 as a lubrication surface formed to protect the contact surface and to prevent the bearing from fretting due to a vibration from outside at non-rotation.

According to the first aspect of the present invention, since the grease for protecting the lubrication surfaces is disposed at the rolling portion of the race and the grease for maintaining the lubrication is disposed at the retainer, at rotation of the bearing the lubricant separated from the grease for maintaining the lubrication can be supplied to the lubrication surface gradually to continue the lubrication, and at non-rotation, it is possible to protect the lubrication oil film as a lubrication surface from fretting by the grease for protecting the lubrication surface, thereby it is possible to provide the ball bearing which maintains a low vibration and a low noise for a long period of time.

Further, according to the second aspect of the present invention, since the basic oil viscosity of the grease for protecting the lubrication surface is made to be lower than the one of the grease for maintaining the lubrication, at non-rotation of the ball bearing, the grease for protecting the lubrication surface enters the contact surface between the balls and the rolling surface rapidly and forms the lubricant oil film to protect the contact surface and prevent the generation of fretting due to the vibration from the outside.

Further, according to the third aspect of the present invention, since the grease for protecting the lubrication surface and the grease for maintaining the lubrication are disposed close each other, the lubricant separated from the grease for maintaining the lubrication is supplied rapidly on the lubricant oil film as a lubrication surface to maintains the lubricant oil film and to continue the lubrication at the boundary surface.

Further, according to the fourth aspect of the present invention, since the churning type of grease having the basic oil viscosity of 15~20 $mm^2/s$ and a worked penetration of 200~230 as the grease for protecting the lubrication surface, and the channeling type of grease having the basic oil viscosity of 25~35 $mm^2/s$ and a worked penetration of 240~270 as the grease for maintaining the lubrication are used, at rotation of the ball bearing, the grease for maintaining the lubrication operates as channeling and the lubricant the basic oil viscosity of which is large is made to be separated. And, by supplying the lubricant gradually to the lubricant oil film, the lubricant oil film of boundary surface is maintained and the lubrication of the boundary surface is continued, thereby the ball bearing which can maintain a low vibration and low noise for a long period of time is provided. Further, at non-rotation, since the grease for protecting the lubrication surface makes the lubricant of small viscosity entered rapidly the contact surface between the balls and the rolling surface to form the lubricant oil film and to protect the contact surface at non-rotation from outside can be prevented.

Further, according to the fifth aspect of the present invention, since the grease for protecting the lubrication surface is disposed on the rolling surface of the race portion, the grease for maintaining the lubrication is disposed at the retainer portion, and at rotation of the ball bearing, the lubricant oil film at the boundary surface is maintained by the grease for maintaining the lubrication to continue the lubrication, at non-rotation of the ball bearing the grease for protecting the lubricating surface forms the lubricant oil film in the contact surface between the balls and the rolling surface to lubricate the ball bearing, the lubrication of the boundary surface at rotation of the ball bearing can be continued and at non-rotation of the ball bearing the fretting of the contact surface can be prevented.

Further, according to the sixth aspect of the present invention, since the grease for protecting the lubrication surface and the grease for maintaining the lubrication are disposed close, and the lubricant separated from the grease for maintaining the lubrication is adapted to supply to the lubricant oil film as a lubrication surface and lubricate the boundary surface at rotation of the ball bearing, by supplying the lubricant rapidly to the lubricant oil film of the boundary surface, at high rotation of the ball bearing too, it is prevented to lack for the lubricant oil film and the lubrication of the boundary surface can be continued.

What is claimed is:

1. A ball bearing characterized by disposing a grease at a race portion for protecting lubricated surfaces of race portions and disposing another grease having different physical characteristics on a retainer portion for maintaining lubrication on the retainer portion, wherein a viscosity of a basic oil of the grease for protecting the lubricated surfaces is lower than the viscosity of the basic oil of the another grease for maintaining the lubrication, and the grease for protecting the lubricated surfaces and the another grease for maintaining the lubrication are disposed close to each other.

2. The ball bearing according to claim 1, wherein the grease for protecting the lubricated surfaces is a churning type of a basic oil viscosity of 15~20 mm$^2$/s and a worked penetration of 200~230, and the another grease for maintaining lubrication is of a channeling type of a basic oil viscosity of 25~35 mm$^2$/s and a worked penetration of 240~270.

3. A ball bearing characterized by disposing a grease at a race portion for protecting lubricated surfaces of race portions and disposing another grease having different physical characteristics on a retainer portion for maintaining lubrication on the retainer portion, wherein the grease for protecting the lubricated surfaces and the another grease for maintaining the lubrication are disposed proximate one another, the grease for protecting the lubricated surfaces is a churning type of a basic oil viscosity of 15~20 mm$^2$/s and a worked penetration of 200~230, and the another grease for maintaining lubrication is of a channeling type of a basic oil viscosity of 25~35 mm$^2$/s and a worked penetration of 240~270.

4. A method of lubricating a ball bearing having an inner race, an outer race and a retainer, comprising:
   applying a churning type grease to form a lubricant film on the inner surface of the outer race;
   applying a channeling type grease to the retainer;
   applying a centrifugal force to the channeling type of grease to separate a lubricant therefrom; and
   supplying the separated lubricant to the lubricant film on the inner surface of the outer race.

* * * * *